(12) United States Patent
Deng et al.

(10) Patent No.: US 8,074,024 B2
(45) Date of Patent: *Dec. 6, 2011

(54) ELECTRONIC FLASH MEMORY EXTERNAL STORAGE METHOD AND DEVICE

(75) Inventors: Guoshun Deng, Shenzhen (CN); Xiaohua Cheng, Shenzhen (CN)

(73) Assignee: Netac Technology Co., Ltd., Shenzhen (CN)

( * ) Notice: Subject to any disclaimer, the term of this patent is extended or adjusted under 35 U.S.C. 154(b) by 39 days.

This patent is subject to a terminal disclaimer.

(21) Appl. No.: 12/436,636

(22) Filed: May 6, 2009

(65) Prior Publication Data

US 2009/0222619 A1 Sep. 3, 2009

Related U.S. Application Data

(62) Division of application No. 10/897,519, filed on Jul. 24, 2004, now Pat. No. 7,788,447, which is a division of application No. 09/687,869, filed on Oct. 13, 2000, now Pat. No. 6,829,672.

(30) Foreign Application Priority Data

Nov. 14, 1999 (CN) .................................. 99 1 17225
Feb. 23, 2000 (CN) .................................. 00 1 14081

(51) Int. Cl.
*G06F 12/00* (2006.01)

(52) U.S. Cl. ............ 711/115; 711/4; 711/100; 711/102; 711/103; 710/100; 710/105; 710/301; 710/302; 710/313; 710/314; 710/315; 365/189.011; 365/189.02; 365/189.15; 365/189.16; 365/189.17; 365/191; 365/193; 365/194; 365/226; 365/230.01; 365/230.02

(58) Field of Classification Search ................. 711/100, 711/102–103, 115; 365/189.011, 189.02, 365/189.15, 189.16, 189.17, 191, 193, 194, 365/226, 230.01, 230.02; 710/100, 301–302, 710/105, 313–315

See application file for complete search history.

(56) References Cited

U.S. PATENT DOCUMENTS

| 5,301,293 | A | * | 4/1994 | Kano | 711/112 |
| 5,657,455 | A | * | 8/1997 | Gates et al. | 710/100 |
| 5,748,158 | A | * | 5/1998 | Kim | 345/33 |
| 5,754,112 | A | * | 5/1998 | Novak | 340/635 |
| 6,012,103 | A | * | 1/2000 | Sartore et al. | 710/8 |
| 6,148,354 | A | * | 11/2000 | Ban et al. | 710/301 |
| 7,788,447 | B2 | * | 8/2010 | Deng et al. | 711/115 |

* cited by examiner

*Primary Examiner* — Tuan Thai
*Assistant Examiner* — Zhuo Li
(74) *Attorney, Agent, or Firm* — Troutman Sanders, LLP (57) ABSTRACT

An electronic flash memory external storage method and device for data processing system includes firmware which directly controls the access of electronic storage media and implements standard interface functions, adopts particular reading and writing formats of the external storage media, receives power via USB, externally stores data by flash memory and access control circuit with the cooperation of the firmware and the driver with the operating system, and has write-protection so that the data can be safely transferred. The method according to present invention is highly efficient and all parts involved are assembled as a monolithic piece so that it has large-capacity with small size and high speed. The device operates in static state and is driven by software. It is plug-and-play and adapted to data processing system.

21 Claims, 8 Drawing Sheets

ELECTRONIC FLASH MEMORY EXTERNAL STORAGE METHOD AND DEVICE

RELATED APPLICATION

This application is a divisional application of U.S. application Ser. No. 10/897,519 filed on Jul. 24, 2004 now U.S. Pat. No. 7,788,447, which is a divisional application of U.S. application Ser. No. 09/687,869 filed on Oct. 13, 2000 now U.S. Pat. No. 6,829,672. The teachings of these applications are incorporated by reference herein in their entirety.

FIELD OF THE INVENTION

This invention is related to storage device for data processing system, especially related to external storage method and its device for micro, handheld and portable data processing systems.

BACKGROUND OF THE INVENTION

Since the invention of computer, people have been paying close attention to the improvement of computer external storage device, from magnetic drum, magnetic tape to floppy disk and hard disk to exchange, save and backup data and file. For more than a decade, personal computer technology has been improved quickly, but the technology of floppy disk as a removable external storage has no substantial improvement. The only improvement of floppy disk is that the size was reduced from 8 inches, to 5.25 inches, and to 3.5 inches, and the capacity was increased to 1.44 MB. Other than the above improvements, the floppy disk technology stays as what it was ten years ago and there is no further improvement. As we all know, floppy disk has the following disadvantages: small capacity, low speed, easy to be damaged, low reliability. Especially, floppy disk drive is big and heavy. All these disadvantages have caused great inconvenience to users. In the past few years, there are some other storage devices in the market, such as high-capacity ZIP disk, removable optic disc MO etc. These devices have some advantages that floppy disk does not have, such as larger capacity, better reliability than floppy disk, etc. But they still have such disadvantages: big, heavy, requiring physical drive, difficult to carry, complicated to use, requiring external power supply, hard to popularize, high price and so on. Only very small number of computers are equipped with physical drives for such storage devices. In addition, in order to install such an internal drive, you must turn off the computer, open computer casing and find a place in the computer to mount it. Then you need to close the casing, power on your computer and install software driver for the device. You can not use the device until all the above steps have been finished. Obviously, ordinary computer users, even computer specialists may find such storage devices too troublesome to use, not to mention those users who are not familiar with computers.

To sum up, a new kind of computer storage device is urgently needed to replace or complement floppy disk and other external storage device using existing technology. The need is especially urgent for those increasingly popular notebooks and handheld devices. Floppy disk drive and other physical drives, due to their big size and heavy weight, are not suitable for notebooks and handheld devices which must be light, convenient, small and portable. In fact, more and more notebooks don't have build-in floppy disk drive or CDROM drive for the purposes of compactness and convenience.

Universal Serial Bus (USB) is a new computer technology in recent years. Its standard is defined by some international big companies such as Intel, Microsoft and Compaq etc. The purposes of USB are to make the use of personal computers simpler, easier and faster, and to replace existing serial port, parallel port and keyboard port etc. Today, all Pentium II or above computers (including compatible computers) are equipped with USB. USB has become a new industry standard for personal computer. There may be some other high-speed universal bus standards in the future.

At the time when USB is widely available today, users can no longer tolerate the situation that micro or portable data processing devices can not install built-in floppy disk or other similar storage devices. Users also can hardly tolerate low-capacity, low-speed and vulnerable storage devices like floppy disk, especially can not tolerate the defects that drives for such devices are big and hard to install.

SUMMARY OF THE INVENTION

The present invention provides an electronic flash memory external storage method to overcome the shortages of current storage technology. The method uses electronic flash memory, standard universal bus and plug-and-play technology to provide a new external storage device to computer users. All parts and PCB of the external storage device are assembled as a monolithic piece. The high-capacity and high-speed device is simple, light, convenient, portable, easy to use and highly reliable.

The invention only uses software to implement external storage functions and can be implemented on different operating system. It is applicable to various data processing systems supporting standard universal bus.

The objects of the present invention are accomplished by the following technical scheme:

The scheme adopts an electronic flash memory external storage method that includes the use of DC power supply and storage media, and has the following characteristics:

said storage media is flash memory, all components and PCB (printed circuit board) used are assembled as a monolithic piece, said storage method uses software to implement external storage functions (to replace physical drive), and every part is physically at a standstill during the process of access.

Said external storage method involves flash memory and the connecting universal bus interface controller, microprocessor and suspend/resume circuit. The external storage device is connected with data processing system through universal bus interface. The firmware of the external storage device is designed inside the microprocessor. After initialization, the firmware can process standard interface operation requests and special operation requests to the external storage device. After processing the requests, the firmware sends the results back to the requesters. Meanwhile, the driver of the external storage device is implemented and installed in the operating system. The driver is initialized when the external storage device is plugged into host computer. During initialization, the driver instructs upper layer of the operating system to generate a removable drive for the external storage device and assign a corresponding device symbol for it. Afterwards, in response to conventional magnetic disk operation requests, the driver converts these requests into special instructions for the external storage device. The driver then sends the converted instructions to the firmware of the external storage device through bottom layer operating system and universal bus interface control circuit. The firmware executes the instructions and sends results and status back to the driver through the operating system. There are two categories of instructions for the external storage device: read and write. Due to the characteristic that valid data of the flash memory can not be overwritten, a write command is therefore converted into three steps: read, internal erasing, data merge and writing back.

An electronic flash memory external storage device, which comprises storage media and DC power supply, is designed and implemented. All parts and PCB (printed circuit board) used for the external storage device are assembled as a monolithic piece. It uses software to implement external storage functions. The external storage device, including all of its parts, is physically at a standstill during the process of access.

There is an access control circuit on said PCB, which comprises microprocessor, USB interface controller, USB connector and suspend/resume circuit. Said storage media is flash memory. Said microprocessor is connected with USB interface controller, suspend/resume circuit and flash memory respectively. The USB interface controller is connected with USB connector, suspend/resume circuit, flash memory and microprocessor respectively. The USB connector is connected with data processing host machine through USB cable.

Said external storage device is driven by the driver and the firmware. The firmware resides in the microprocessor and the driver is loaded between upper layer operating system and lower layer operating system of the host computer.

An application example of the external storage device is to utilize it in data processing system. The device is connected with the system through universal bus interface. Driver for the external storage device is installed in the operating system of the data processing system. Under the management of the operating system, users can operate the external storage device the same way operating a classical disk. The driver receives standard disk operation requests from operating system and converts the requests into special instructions for the external storage device. The driver then sends the converted instructions to the firmware through bottom layer operating system and universal bus interface control circuit. The firmware executes the instructions and sends results and status back to the driver through the operating system. Up to this point, the data exchange procedure between the external storage device and data processing system is completed. The recognition procedure of the external device when it is plugged into the host machine includes device plug-in, device registration and allocation of device symbol. The external storage device is plug-and-play without shutting down the host machine when plugging in or pulling out the device.

DETAILED DESCRIPTION OF THE INVENTION

Following is the description of a preferred embodiment of the present invention, which description should be taken in conjunction with the accompanying drawings.

An electronic flash memory external storage method, which includes the use of DC power supply and storage media, wherein with the following characteristics:
  said storage media is flash memory;
  all components and PCB (printed circuit board) used are assembled as a monolithic piece;
  said storage method uses software to implement external storage functions (to replace physical drive); and
  every part is physically at a standstill during the process of access.

Said storage method includes:
  the establishment of data exchange channel between data processing host computer and external storage device;
  connecting method of the power supply source;
  method of setting up physical storage media of the external storage device and its internal data structure;
  method of reading and writing the external storage media;
  method of interpreting and executing read and write commands;
  method of transferring data between the host computer and the external storage device;
  installation procedures of driver of the external storage device; and
  method of data exchange between the host machine operating system and said driver.

Figure 8:
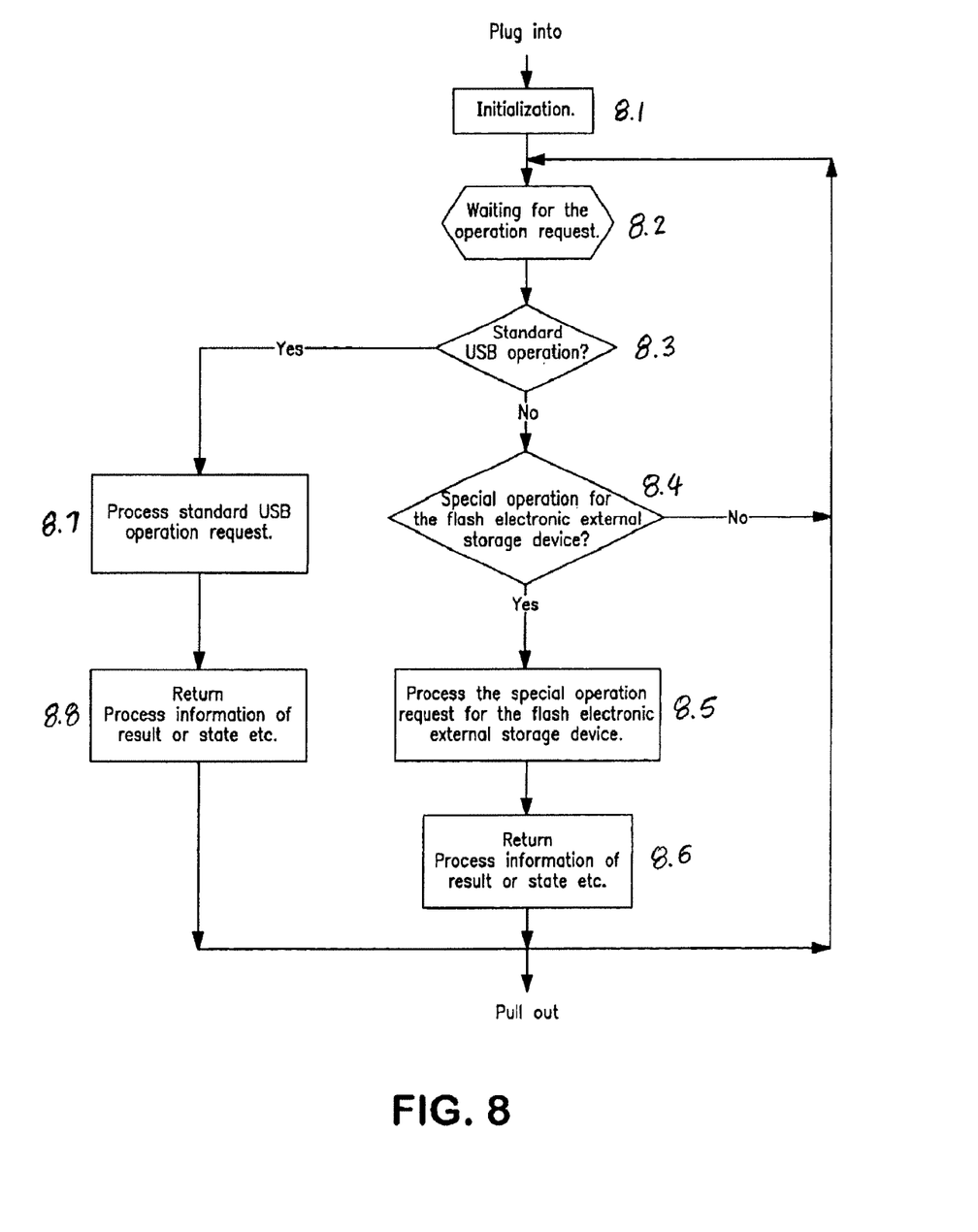
FIG. 8 shows the firmware flowchart.

Said storage method also includes a firmware that resides in the electronic flash memory external device and directly controls the access of flash memory and implements standard interface functions. The firmware resides in the microprocessor and works according to the firmware flowchart as shown in FIG. 8. When the external storage device is plugged into the data processing a host computer, the firmware coordinates with the driver in the operating system to accomplish the initialization of the device (step 1), then waits for the operation request (step 2). According to the requirements of operating system and the driver, if the request is a interface standard operation, the firmware executes standard interface operation instructions and returns back the processing result or status information etc. (steps 3, 4, 5); If not but a special operation for the external storage device, the firmware executes the special operation instructions and returns back the processing result or status information etc. (steps 3, 6, 7, 8); or else the firmware ignores the operation request and returns back to step 2.

Figure 7:
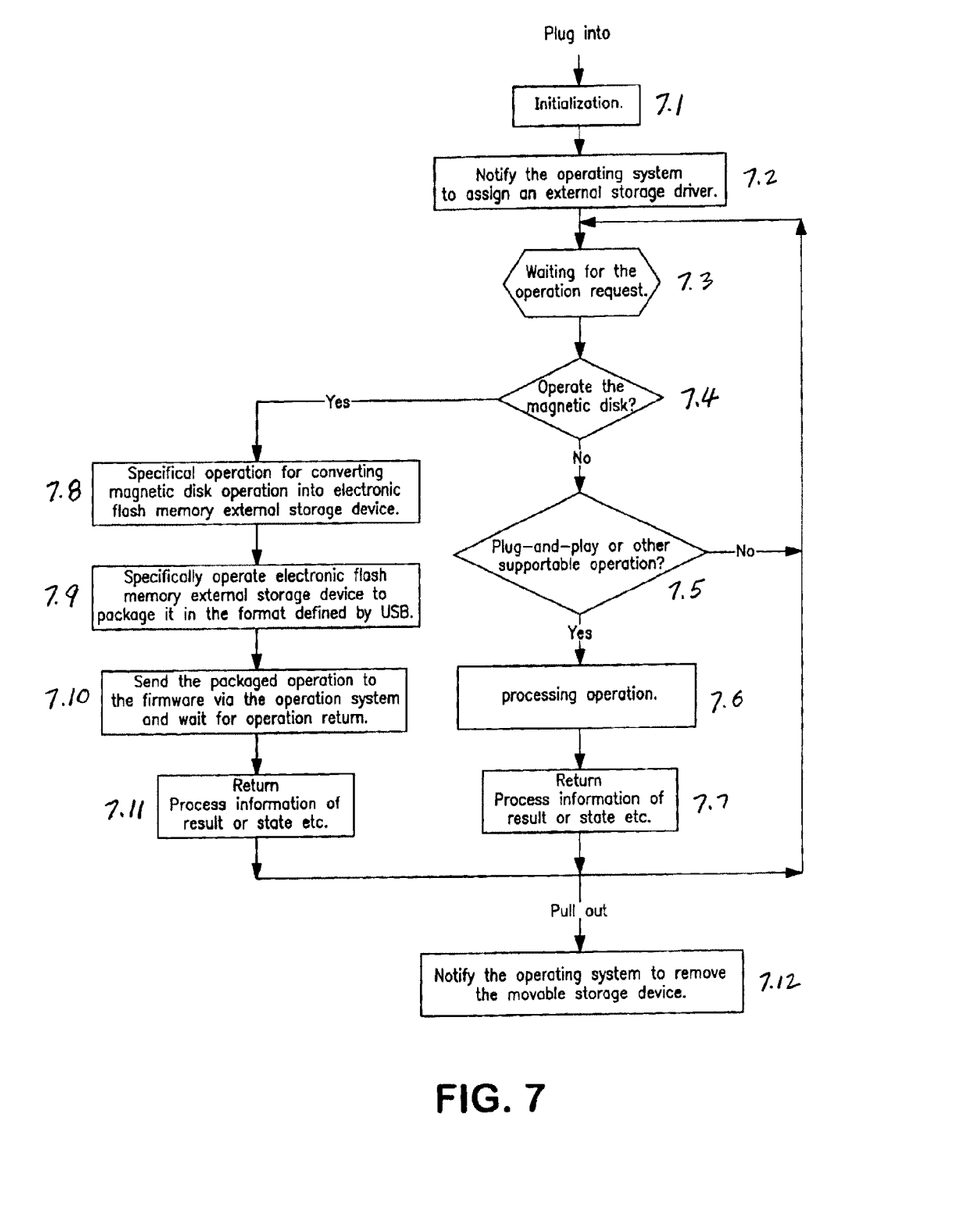
FIG. 7 shows the driver flowchart.

Said driver works according to the software flowchart for the driver as shown in FIG. 7. When the external storage device is plugged into the data processing host machine, the driver coordinates with the firmware to accomplish the initialization of the device and notifies the operating system to assign and display a device symbol for the external storage device. The driver also needs to process the operation requests sent from the operating system to the external storage device. At present, the operation request is mainly in magnetic disk operation format. It needs to be converted by the driver into special operation instruction for the external storage device, packaged in the format defined by the universal bus standards and sent to the firmware for execution. In addition, the driver needs to accomplish plug-and-play and coordinates with the operating system. Once the external storage device is pulled out, the driver will immediately notify the operating system to remove the corresponding device symbol of the external storage device.

Said storage method, which can be applied to all data processing systems supporting universal bus, includes the following contents:

The data exchange channel between said data processing system host machine and the external storage device is universal bus. It does not need extra interface card, big physical drive or mechanical moving parts. It is light in weight, quick to start up and plug and play. The working power for the device is supplied from the universal bus. No extra external power supply is needed. It is convenient and easy to use. At present, the universal bus adopted is USB (Universal Serial Bus). USB is a new international standard for computer peripheral devices, which can replace the legacy parallel ports, serial ports, keyboard interface and mouse interface etc. The purpose of USB is to provide unified interface for computer peripheral devices, to improve transferring speed, to increase number of connectable devices, to increase transferring distance and to facilitate computer users. Today many computer peripheral devices such as scanner, printer, digital camera, keyboard and mouse have adopted USB interface.

The storage media of said external storage device is flash memory. This flash memory is a kind of large-capacity electronic memory chip with small size and high speed. Data of the flash memory can be randomly or sequentially read and written. Data can also be erased. Erasing operation is in unit of data block, which can be erased for up to 1 million times. Flash memory is an excellent data storage media with the capability to store data for more than 10 years without power supply. This kind of flash memory has another feature that if the target memory area of a write operation contains valid data, the valid data in this memory area must be read out first before the memory area will be erased and then the new data can be successfully written in, wherein said valid data is the useful data that should be saved an can not be erased. This feature is perfect to protect the valid data in the flash memory though it makes the write operation more complicated. The capacity of an external storage device using flash memory is normally five to six times larger than a floppy disk. The data inside the flash memory is organized in a uniform block model. At present, one data block of the flash memory provides 8K bytes, 16K bytes or 32 k bytes or even 128K bytes available storage capacity. With the advancement of technology, flash memory with even bigger capacity in a single block will probably be available for external storage device.

Said read command for the external storage device comprises the following steps:

upper layer operating system receives the read command from user, wherein the command format is the familiar format used by legacy magnetic disk;

operating system sends said read command to the driver;

the driver converts the read command used by magnetic disk operation into special read instruction which can be understood and executed by the firmware and transfers said converted read instruction to bottom layer operating system;

bottom layer operating system transfers said converted read instruction to the firmware through control circuit of the universal bus; and the firmware executes said converted read instruction, and transfers results and status back to the driver through operating system.

Said write command of the external storage device comprises the following steps:

operating system receives the write command from user, wherein the command format is the familiar format used by legacy magnetic disk;

operating system sends said write command to the driver;

the driver checks whether the external storage device has write protection or not, if no write protection status or not, the driver continues to execute the following steps;

the driver converts the write command used by magnetic disk operation into several special instructions which can be understood and executed by the firmware, and transfers said converted instructions one by one to bottom layer operating system;

bottom layer operating system transfers said converted instructions to the firmware through control circuit of the universal bus;

the firmware executes a read instruction to the target memory area of the write command and transfers data read out back to the driver through operating system;

the firmware executes an erase instruction to said target memory area and transfers erase result back to the driver through operating system;

the driver merges the data read out and the data to be written to said target memory area, and sends the merged data and a write instruction to the firmware, then the firmware writes the merged data back to said target memory area; and the firmware transfers write operation results and status back to the driver through the operating system.

The data exchange method between the data processing system and the external storage device is the standard method defined by the universal bus specifications, not the specifically self-defined internal method for the external storage device. Driver or firmware packages data according to the standard communication protocol before the data is transferred from driver to firmware or from firmware to driver.

Said working power of the external storage device is supplied from USB instead of special power supply from the system. This power supply scheme eliminates power adapter and maximizes the convenience of plug-and-play.

In other examples of implementation, the standard IEEE1394 bus can be adopted as the data exchange channel between the data processing host machine and the external storage device. In this case, working power of the external storage device can be provided from IEEE1394 bus and the data exchange method between the data processing host machine and the external storage device is the standard method defined by IEEE1394.

The present invention uniquely designs a toggle switch that is connected to the write protection pin WP of flash memory. The status of the write protection pin is either pending or connected to ground by the switch. Write protection function of the external storage device is jointly implemented by the WP pin and the firmware detection of the WP pin status. The write protection pin WP has hardware write protection function, that is, it can physically protect the contents of the flash memory from being modified or erased. On the other hand, driver and firmware provide software write protection function for the external storage device. When the WP pin is at the write protection status (WP pin is connected to ground), the firmware notifies this status to the driver and the driver in turn notifies this status to the operating system. As a result, the contents in the flash memory can not be modified or erased and the data saved by the users can be protected. Especially in this case, the external storage device is impossible to be infected by virus.

Figure 1:
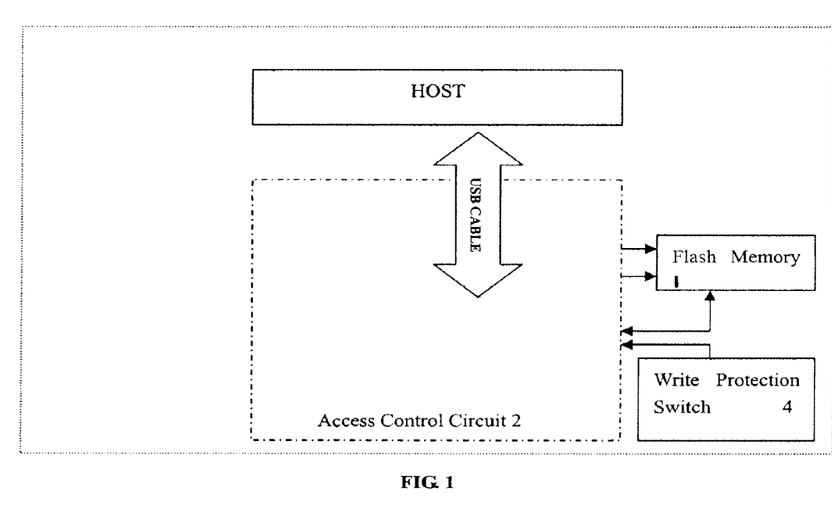
FIG. 1 shows the general hardware block diagram of the electronic flash memory external storage device of the present invention.
Figure 2:
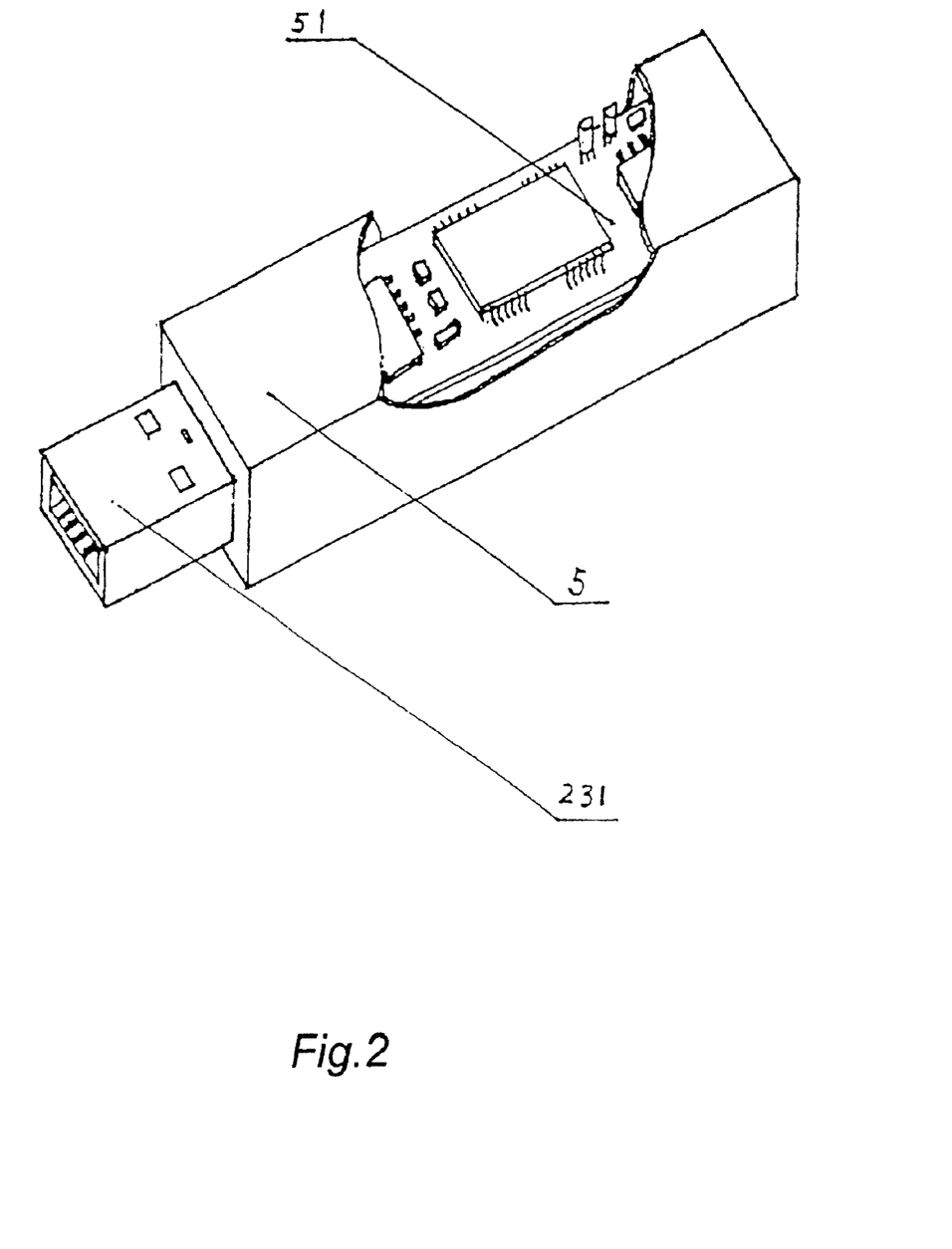
FIG. 2 shows a hardware section diagram of the electronic flash memory external storage device.

The general hardware block diagram of the external storage device of the present invention is shown in FIG. 1. FIG. 1 shows a Flash Memory 1, an Access Control Circuit 2, and a Write Protection Switch 4. FIG. 2 shows the hardware section diagram of the external storage device using USB interface 231. Said storage device is completely contained inside a single casing 5. All components are mounted on a PCB 51 that is contained in the casing 5. The device uses software to implement data storage access functions. The external storage device and its every part are physically at a standstill when the device is at working state.

A flash memory 1, a DC-DC voltage regulator 3 and an access control circuit 2 are mounted on the PCB 51 of the external storage device. Because the flash memory 1 and the access control circuit 2 only comprise electronic components without any mechanical moving parts, the external storage device can be very small, almost the same size of a thumb, and it is very convenient in using and carrying.

Figure 3:
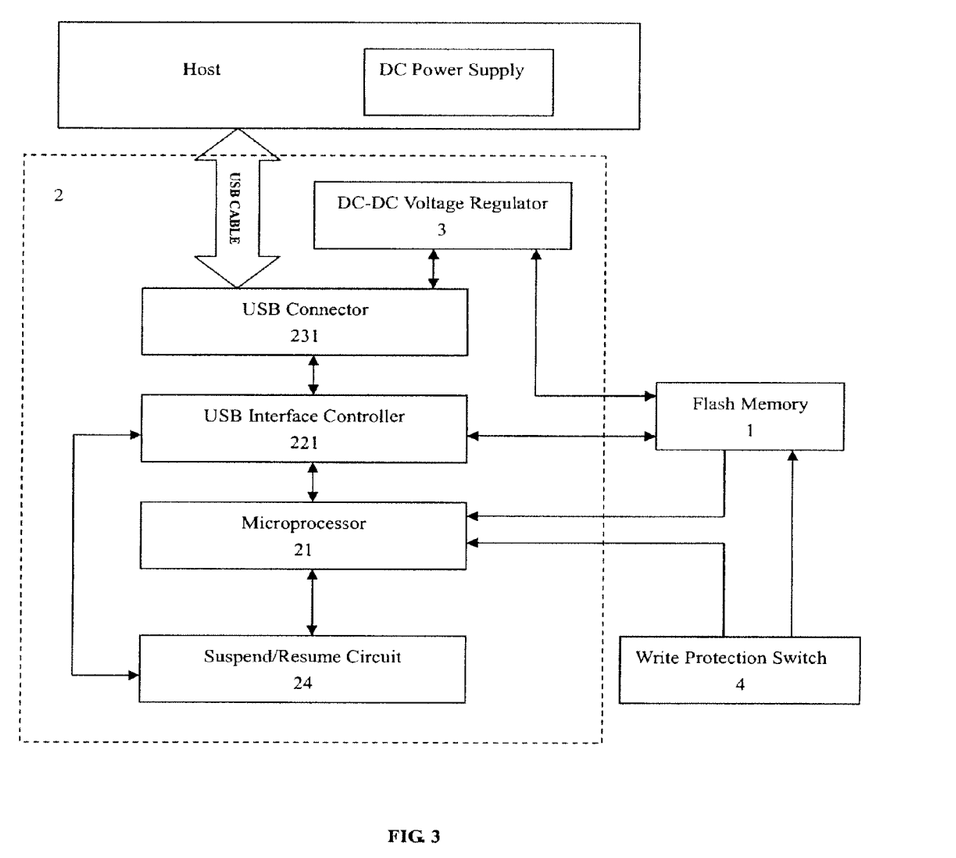
FIG. 3 shows the hardware block diagram of the electronic flash memory external storage device implemented with USB interface.

FIG. 3 shows the hardware block diagram of the external storage device of the present preferred embodiment implemented with USB interface 231. The access control circuit 2 includes a microprocessor 21, a USB interface controller 221, a USB interface 231 and a suspend/resume circuit 24. The storage media is the flash memory 1. The microprocessor 21 is connected with the USB interface controller 221, the suspend/resume circuit 24 and the flash memory 1, with signal flowing in uni-direction or bi-direction. The USB interface controller 221 is respectively connected with the USB connector 231, the suspend/resume circuit 24 and the flash memory 1, with signal flowing in uni-direction or bi-direction. The USB interface 231 is connected with the data processing system through USB cable. A write protection switch 4 is connected with the flash memory 1 and the microprocessor 21, with signal flowing in uni-direction.

The power supply of the DC-DC voltage regulator 3 is provided from the USB interface 231, and is connected with the microprocessor 21, the USB interface controller 221 and the suspend/resume circuit 24. The output pin of the DC-DC voltage regulator 3 is connected with the power supply pin of the flash memory 1.

Today almost all Pentium II or above computers (including compatible computers) are equipped with USB interface. USB has become the new industry standard of personal computer. Therefore, many computers can support the electronic flash memory external storage device of the present invention. Like floppy disk and CDROM, the external storage device will probably become a standard computer peripheral and will eventually replace floppy disk and floppy drive.

Figure 4:
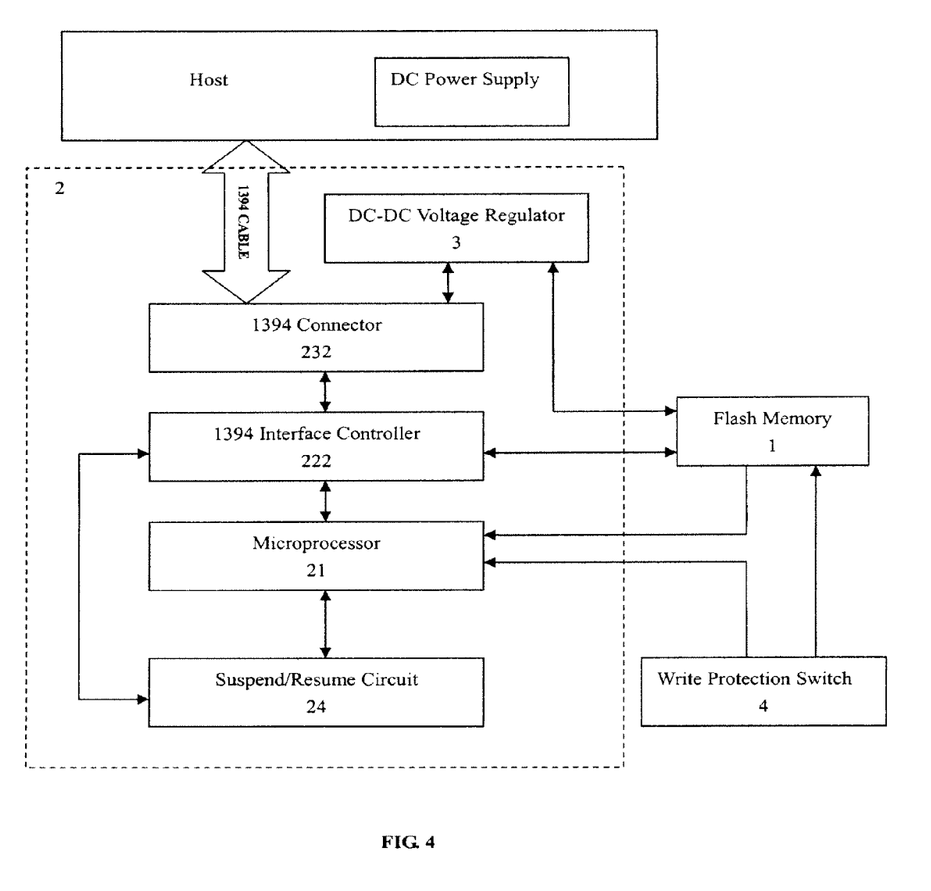
FIG. 4 shows the hardware block diagram of the electronic flash memory external storage device implemented with IEEE1394 interface.

FIG. 4 shows the hardware block diagram of the external storage device of the present preferred embodiment implemented with IEEE1394 interface, wherein the universal bus interface is IEEE1394 interface 232, and the universal bus interface controller is IEEE1394 interface controller 222.

Figure 6:
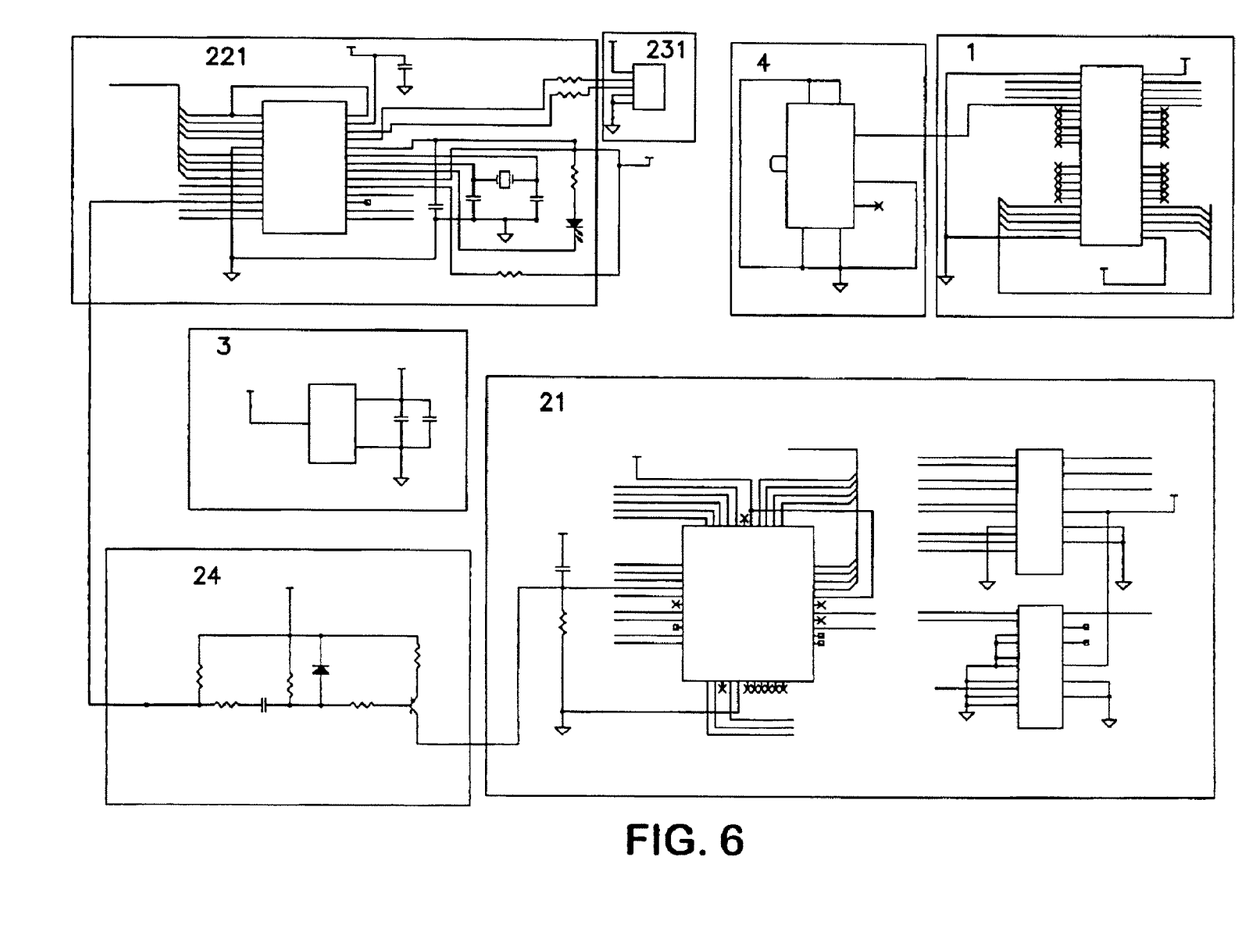
FIG. 6 shows circuit schematics of the electronic flash memory external storage device implemented with USB interface.

FIG. 6, the corresponding figure of FIG. 3, shows the circuit schematics of the external storage device of the present preferred embodiment. The microprocessor 21 is used to control the USB interface controller 221, the flash memory 1 and the suspend/resume circuit 24. The microprocessor 21 comprises a microprocessing chip D4 and two 4053 analog multiplexer/de-multiplexer chips D5 and D6. Pin 12, 1 and 3 of the chip D5 and pin 12 of the chip D6 are connected together and then to pin 12 of the chip D4. Pin 13, 2, 5 of the chip D5 and pin 13 of the chip D6 are connected together and then to pin 13 of the chip D4. Pin 11, 10, 9 of the chip D5 and pin 11 of the chip D6 are respectively connected to pin 44, 1, 2 and 3 of the chip D4. DATA0 to DATA7 of the chip D4 are respectively connected to the corresponding data bus of chip D2 of the USB interface controller 221 and chip D1 of the flash memory 1. Pin 4 of the chip D5 is connected to pin 4 of the flash memory chip D1. Pin 14 of the chip D6 is connected to pin 42 of the flash memory chip D1. Pin 14 and 15 of the chip D5 are respectively connected to pin 15 and 16 of the chip D2.

Said USB interface controller 221 comprises a chip D2 with part number PDIUSBD12, a crystal oscillator Y1, capacitors C1-C2 and C7-C8, resistors R1-R3 and R10, and a LED V3. The crystal oscillator Y1 and the capacitors C1 and C2 are serially connected as a closed circuit. The two pins of the crystal oscillator Y1 are respectively connected to pin 22 and 23 of the chip D2. Pin 25 and 26 of the chip D2 are respectively connected to pin 2 and pin 3 of the USB connector 231 through the resistors R2 and R1. The USB interface controller 221 is responsible for USB data input, data output and data flow control. It is compliant to USB Specifications 1.0 and 1.1. The USB interface controller 221 has an 8-bit high-speed and yet simple parallel bus interface capable of interfacing with most microprocessor, and also supports DMA function.

The flash memory 1 is used for data storage. The part numbers of the flash memory chip D1 can be TC58V64FT/128FT/256FT/512FT or KM29V64000T/128T/256T/512T. Pin 5 of the chip D1 is connected to pin 5 of the write protection switch 4.

The purpose of the suspend/resume circuit 24 is to reduce power consumption. It can switch the external storage device from working state to suspend state, or can wake up the external storage device from suspend state to normal working state. It comprises a transistor V1, a capacitor C4, a diode V2 and resistors R5-R9. The base of the transistor V1 is connected to pin 12 of the chip D2 of the USB interface controller 221 through the resistor R9, the capacitor C4 and the resistor R8. The emitter of the transistor V1 is connected to pin 4 of the microprocessor chip D4.

Figure 5:
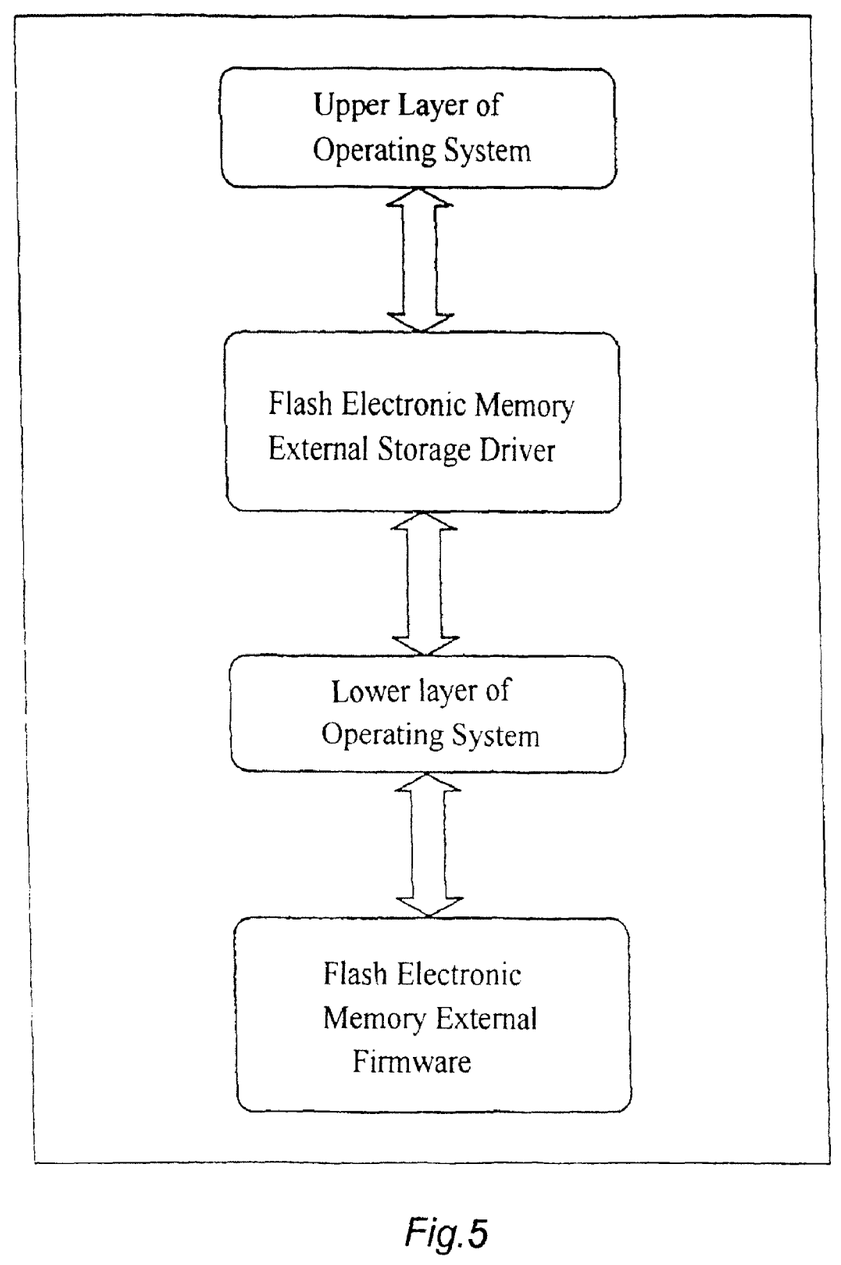
FIG. 5 shows the software block diagram of the electronic flash memory external storage device.

The electronic flash memory external storage device of the present invention does not need physical drive and extra external power supply. It is completely driven by software, that is, driven by the driver and the firmware. The firmware resides in the microprocessor 21 and interacts with bottom layer operating system. The driver is loaded between bottom layer operating system, and interacts with bottom layer operating system and upper layer operating system. The software block diagram of the driver is shown in FIG. 5. The software block diagram of FIG. 5 includes an upper layer operating system 5.1, a flash electronic memory external storage device driver 5.2, a bottom layer operating system 5.3, and a flash electronic memory external firmware 5.4.

The software flowcharts of the driver and the firmware are shown in FIG. 7 and FIG. 8 respectively. FIG. 7 shows an initialization block 7.1, notify the operating system to assign an external storage driver block 7.2, a waiting for operation request block 7.3, an operation of the magnetic disk block 7.4, a plug-and-play or other supportable operation block 7.5, a processing operation block 7.6, a return process inform of result or state etc. block 7.7, a specific operation for converting magnetic disc operation into electronic flash memory external storage device block 7.8, a specifically operate electronic flash memory external storage device to package it in the format defined by USB block 7.9, a send the packaged operation to the firmware via the operation system and wait for operation return block 7.10, a return process information of result or state etc. block 7.11, and a notify the operating system to remove the movable storage device block 7.12. FIG. 8 shows an initialization block 8.1, a waiting for operation request block 8.2, a standard USB operation block 8.3, a special operation for the flash electronic external storage device block 8.4, a process the special operation request for the flash electronic external storage device block 8.5, a return process information of result or state etc. block 8.6, a process standard USB operation request 8.7, and a return process information of result or state etc. 8.8. The inventors of the present invention are preparing to apply to China Software Registration Center for the copyright protection of the driver and the firmware.

When the user plugs the external storage device into the USB port of the computer, the microprocessor 21 immediately starts the execution of the firmware resided in the microprocessor 21. The firmware firstly executes initialization operations. After the initialization, the firmware enters into waiting state to wait for further operation requests.

All initialization code of the firmware is stored in the microprocessor chip D4. When the external storage device is powered up, the operating system inquiries the USB interface chip D2. In response to the inquiry, the chip D2 generates interrupt requests to the microprocessor chip D4. The chip D4 establishes the connection with the operating system by responding to the interrupt requests of D2. Basing on the feedback of various device status and flags from the chips D2 and D4 of the external storage device, the operating system in turn notifies the chips D2 and D4 to finish the initialization and to be prepared for normal data exchange at the next stage.

Through the USB interface, the operating system is able to automatically detect the existence of any new external storage device whenever it is plugged in. In this case, upper layer operating system immediately activates the driver. When the driver is activated, it executes initialization operations and instructs the operating system to create a removable storage device (or movable storage device) for the external storage device. After the operating system receives the instruction, it generates a removable storage device and assigns a corresponding drive symbol for each external storage device plugged in. During the above operating process, the firmware receives and processes operation requests from the driver and the operating system. When the driver finishes the processing of the plug-in operation, it enters into waiting state to wait for further operation requests.

When the user pulls out an external storage device from the USB port of the computer, the firmware terminates its execution immediately. In this case, the operating system can automatically detect that the device has been pulled out from the computer, and immediately notifies the driver of this event. After the driver receives the notification, it immediately executes the relevant operations and instructs the operating system to remove the removable storage device corresponding to the external storage device that has been pulled out. After the operating system receives the instruction, it removes the corresponding removable storage device and drive symbol immediately.

When the upper layer of the operating system receives a read command, it passes the read command to the driver. Because the format of the read command is the standard magnetic disk operation format which is different from the operation format of USB and flash memory, the driver converts the read command into the special instruction for the electronic flash memory external storage device. After the conversion, the driver again packages the converted instruction into USB packets, and sends the packaged read instruction to bottom layer operating system. Bottom layer operating system in turn sends the read instruction through the USB interface to the firmware running in the microprocessor of the electronic flash memory external storage device. The firmware executes the read instruction and sends the read data and status back to the driver through bottom layer operating system. Then the driver sends the read data and status to upper layer operating system. Up to this point, the process of the read command is finished.

When the data processing system requests to read data, the USB interface controller chip D2 notifies the microprocessor chip D4. According to the request of the operation system, the microprocessor chip D4 reads the requested data from the flash memory D1, and sends the data back to the chip D2. The chip D2 in turn sends the requested data back to the data processing system.

When upper layer operating system receives a write command, it passes the write command to the driver. Because the format of the write command is the standard magnetic disk operation format which is different from the operation format of USB and flash memory, the driver converts the write command into special instructions for the electronic flash memory external storage device. The new data of the write command can not be successfully written into the flash memory if the target memory area of the flash memory contains valid data. In this case, the target memory area must be erased before any new data can be successfully written into the same memory area. Because of this characteristic of the flash memory, the driver converts the write command into three different internal instructions: read, erase and write. Firstly the driver executes the internal read instruction to read out the valid data already contained in the target memory area of the write command, and stores the read data into an internal buffer of the driver. Then the driver executes the internal erase command to erase all data contained in the said target memory area. Finally, the driver merges the new data need to write into the target memory area with the data saved in the internal buffer of the driver, and executes the internal write instruction to write the merged data into the said target memory area of the flash memory. After the above three internal instructions have been completed, the driver sends the operation status to upper layer operating system. Up to this point, the process of the write command is finished.

When the data processing system requests to write data into the flash memory 1 i.e. D1, the USB interface controller chip D2 notifies the microprocessor chip D4. According to the request of the operation system, the microprocessor chip D4 reads corresponding data from the chip D2 and writes the data into the flash memory D1.

When the operating system requests the external storage device to erase the flash memory, the USB interface controller chip D2 notifies the microprocessor chip D4. Upon receiving the notification, the microprocessor chip D4 sends a sequence of instructions to the flash memory D1 to erase the contents of the target memory area in flash memory D1.

In this preferred embodiment, the driver packages the above said three internal instructions into USB packets and respectively sends each USB packet to bottom layer operating system. Bottom layer operating system in turn sends the USB packets through USB interface to the firmware resided in the microprocessor. The firmware executes the instructions and sends the data and status back to bottom layer operating system through the USB interface. Then bottom layer operating system sends the data and status to the driver. Furthermore, said firmware also implements the special operation of the external storage device.

The electronic flash memory external storage device of the present invention includes universal bus interface controller and interface connector, electronic flash memory, suspend/resume circuit, the power supply obtained from the universal bus, and microprocessor. The microprocessor directly controls the access to the storage media of the device and includes a firmware that implements standard functions. The external storage device is supported by the driver installed in the operating system and is supported by system hardware, and has the following characteristics:

Said external storage device of the present invention is used as the external storage device of data processing system.

Said external storage device of the present invention can also be used as the external storage device of digital microcomputer. Today USB is the standard configuration of Pentium II and compatible computers. The wide acceptance of electronic flash memory external storage device of the present invention can be expected soon.

Said external storage device of the present invention can also be used as the external storage device of handheld device. This kind of product has been expected for a long time by the users of the popular PDA (personal digital assistant) and other handheld devices.

In addition, said external storage device of the present invention can also be used as the external storage device of portable data processing system. Users of portable data processing system such as notebook/sub-notebook computers have been working without effective external storage device for many years due to the big size of floppy disk drive. Now their long expectation to have a good external storage device can be satisfied by our external storage device of the present invention.

Compared with current technologies, the electronic flash memory external storage method and device of the present invention used in data processing system has the following advantages:

It uses flash memory as storage media and uses universal bus. The device is a removable external storage device that does not need any physical drive and extra external power supply. It is plug-and-play without shutting down the host machine. The speed of the device is fast and its capacity is several times, tens of times, hundreds of times, thousands of times or even higher, of the capacity of floppy disk. It is small, very easy to carry and hard to be damaged. Data retention of the device can be 10 years or even longer. It can be erased for 1 million times or more. More than 20 such devices can be simultaneously connected to the computer. The method and the device of the present invention are applicable to any data processing system that supports universal bus.

The part numbers and specifications of the main components used in the preferred embodiment of the present invention are listed as follows:

| Symbol | Name | Part Number | Supplier |
| --- | --- | --- | --- |
| D1 | flash memory | TC58V64FT/128FT/256FT/512FT or | TOSHIBA |
| | | KM29U64000T/128T/256T/512T | SAMSUNG |
| D2 | USB interface controller | PDIUSBD12 | |
| D3 | DC--DC voltage regulator | X62FP3302 | |
| D4 | microprocessor | 8051/series | INTEL |
| D5, D6 | analog multiplexer/de-multiplexer | CD4053 | |
| Y1 | crystal oscillator | 6 MHz | |
| J1 | USB connector | | |
| C1-C8 | capacitor | | |
| R1-R10 | resistor | | |
| V1 | transistor | | |
| V2 | LED | | |
| V3 | diode | | |

What is claimed is:

1. A computer system comprising a memory and a Universal Serial Bus (USB) port, said memory stores an operating system, said operating system comprises one or more drivers for a flash memory storage device (FMSD), said FMSD comprises a monolithic circuit comprising a USB connector, a microprocessor and a flash memory unit module,
wherein upon plugging said FMSD into the computer's USB port, said operating system assigns and displays a device symbol for said FMSD and processes operation requests from a user to access said FMSD without converting between the USB protocol and another communication protocol.

2. The computer system according to claim 1, wherein said microprocessor further comprises a firmware for processing user requests to access the flash memory module.

3. The computer system according to claim 2, wherein said USB connector establishes a data exchange channel between the computer system and said FMSD; wherein said establishing a data exchange channel includes initialization of firmware, the firmware awaiting a message from the driver, and thereafter exchanging messages between the firmware and the driver.

4. The computer system according to claim 2, wherein said microprocessor executes an initialization code of the firmware when said FMSD is plugged into the USB port of the computer system.

5. The computer system according in claim 2, wherein said firmware performs read, write or erase operations on the flash memory module in response to a user's request.

6. The computer system according to claim 5, wherein the write operation performed by the firmware further comprises
an operation to read out data in a partially-written block;
an operation to erase the partially-written block;
an operation to merge the read-out data with new data to be written; and
an operation to write the merged data into the erased block.

7. The computer system according to claim 1, wherein the driver is capable of converting a request in magnetic disk format into special operation instruction for the device.

8. The computer system according to claim 1, which automatically detects the device when it is plugged in and activates the driver, and wherein the driver executes an initialization operation and instructs the computer system's operating system to create a device symbol representing a removable storage device.

9. The computer system according to claim 1, wherein the driver coordinates with the microprocessor to accomplish initialization of the FMSD when the device is plugged into the USB port of the computer system.

10. The computer system according to claim 9, wherein said initialization can include standard interface operation or special interface operation.

11. The computer system according to claim 1, wherein said device symbol enables a user to operate the FMSD in the same way as a magnetic disk.

12. The computer system according to claim 1, wherein said device symbol enables a user to access the FMSD without a communication protocol conversion.

13. The computer system according to claim 1, wherein said user requests to access the flash memory module are initially made at the computer system in magnetic disk format.

14. The computer system according to claim 1, wherein said device symbol display is removed when said FMSD is disconnected from the computer system.

15. The computer system according to claim 2, wherein said user requests to access the flash memory module are received by the firmware without a communication protocol conversion.

16. The computer system according to claim 2, wherein said firmware receives said user requests to access the flash memory module that have been converted from a magnetic disk format.

17. The computer system according to claim 2, wherein the firmware receives an operation request from either the driver or the computer system's operating system which indicates the presence of a device symbol on the computer system and wherein said device symbol enables a user to operate the FMSD in the same way as a magnetic disk.

18. The computer system according to claim 2, wherein said firmware is enabled to receive a special operation instruction from the driver for the FMSD, wherein the special operation instruction having been converted from a user request in magnetic disk format.

19. The computer system according to claim 18, wherein the special operation instruction is received on the USB connector in a standard USB packet.

20. The computer system according to claim 18, wherein the special operation instruction further includes an erase command requiring an erase of a partially-written block and the firmware is enabled to read out any data to be saved in the partially-written block prior to erasing the partially-written block.

21. The computer system according to claim 1, which provides a DC power supply through said USB connector to said flash memory module and said microprocessor upon connecting said FMSD with said computer system.

* * * * *